3,141,778
CELLULOSE ESTER FOOD COATING COMPOSITION AND FOOD ARTICLES COATED THEREWITH
Mortimer S. Thompson, North Woodbury, Conn., and Alvan R. Ross, Plainfield, N.J., assignors to Celanese Corporation of America, New York, N.Y., a corporation of Delaware
No Drawing. Filed Apr. 17, 1961, Ser. No. 103,258
17 Claims. (Cl. 99—166)

This invention relates to coating, especially hot melt coating and has particular reference to the coating of articles of food such as meat as well as to novel compositions useful in coating articles of food. More particularly, this invention is concerned with the provision of articles of food packaged in protective envelopes which are tightly adhering but which may be readily stripped away from the article of food. Packaged articles of this type are described in U.S. Patent 2,840,475 to Patten et al.

Hot melt compositions comprising cellulose organic acid esters such as cellulose propionate and plasticizers provide desirable coatings in that they are transparent, durable, non-toxic and easily stripped away. It is often necessary to maintain such a composition in molten condition for relatively long periods while the composition is being applied to articles of food. For example a pool of the composition may be kept molten for several hours while pieces of meat are passed successively through the pool. Under these conditions the compositions tend to degrade; they become discolored and give off undesirable and irritating fumes, and their viscosity changes abruptly with a concomitant change in the thickness of the coating deposited on the meat.

It is accordingly an object of this invention to provide a novel coating composition and a method of hot melt coating which will overcome the above-mentioned deficiencies.

It is a further object of this invention to provide a novel coating composition containing cellulose esters and plasticizers which retain the above-mentioned advantages of cellulose ester-plasticizer compositions while overcoming the deficiencies of said compositions.

These and other objects of this invention will become apparent from the specification and claims which follow in which all proportions are by weight unless otherwise stated.

According to one aspect of this invention, the defects described above are overcome in large measure by the inclusion of a glycol in the composition containing the cellulose organic acid ester. A particularly suitable combination is obtained when the glycol is used in a cellulose propionate composition especially one containing a plasticizer.

The plasticizer may be any suitable plasticizer for cellulose esters, with the understanding, of course, that if the coating composition is to be used on foods, the plasticizer must be non-toxic.

Suitable palsticizers include trialkyl esters of citric acid such as monoisopropyl citrate; triethyl citrates; trialkyl esters of acyl citric acid such as acetyl tributyl citrate, acetyl triethyl citrate; alkyl phthalyl alkyl glycolates e.g., ethyl phthalyl ethyl glycolate, methyl phthalyl ethyl glycolate and butyl phthalyl butyl glycolate; lower aliphatic esters of phthalic acid e.g., dimethyl phthalate, diethyl phthalate, and dibutyl phthalate; dialkyl phthalates e.g., di-2-ethylhexyl phthalate, dimethyl cyclohexyl phthalate, butyldecyl phthalate, butyloctyl phthalate, diisobutyl phthalate, diisodecyl phthalate, octyldecyl phthalate and other phthalates such as butylbenyl phthalate, dicyclohexyl phthalate, hydrogenated castor oil phthalate, dihydroxy abietyl phthalate, di(2-ethylhexyl) hexahydro phthalate, di-2-ethylhexyl phthalate and diisooctyl phthalates and other dibasic acid esters such as dialkyl adipates e.g., diisobutyl adipate, dihexyladipate, diisodecyl adipate and di-n-octyldecyl adipate, sebacates such as dibutyl sebacate and dioctyl sebacate; stearate esters e.g., glycerol monosterate, n-butyl stearate, glycerol monohydroxy stearate; p-tert-butylphenyl salicate; alkyl phosphates e.g., triethyl phosphate; aryl phosphates e.g., triphenyl phosphate as well as arylalkyl phosphates such as diphenyl-2-ethyl hexyl phosphate; glycol esters of acids e.g. ester of diethylene glycol and adipic acid, dipropylene glycol dibenzoate, diethylene glycol dibenzoate and triethylene glycol polyester of phthalic anhydride; castor oil and mineral oil; glycerol mono-oleate, glycerol triacetate, and glycerol tributyrate; glyceryl triacetate; and epoxidized long chain fatty acid triglycerides derived from fatty acids containing between 12 and 22 carbon atoms e.g., epoxidized soya bean oil.

When the coating composition is used on articles of food, the glycol should be non-toxic. Such non-toxic glycols include aliphatic diols such as dihydroxy alkanes, e.g. 1,2 propylene glycol which is preferred, ethylene glycol and hexylene glycol and glycol ethers such as triethylene glycol. Other operable glycols include polymerized glycol ethers such as polyethylene glycol, having a molecular weight of from 200–6000, and polypropylene glycol as well as butoxy propylene glycol. In the preferred compositions comprising cellulose esters and plasticizers, a suitable proportion of glycol is preferably in the range of up to about 10% based on the total weight of the composition and most preferably from 2 to 5% of said composition.

If desired, the composition may also include conventional hot melt additives such as waxes and oils.

The cellulose organic acid ester is preferably an ester of cellulose and a saturated monocarboxylic aliphatic acid. In coating articles of food, cellulose propionate is preferred, particularly cellulose propionate preferably having from 0.2 to 0.3 free hydroxyl groups per glucose unit and a viscosity range of from about 0.2 sec. up to about 24 sec., ASTM D871–56 using a 20% solution in 90/10 acetone/ethanol, and most preferably from 0.2 to 10 sec. The cellulose propionate preferably has at least 2 propionyl groups per glucose unit.

Cellulose butyrate and mixed esters such as cellulose acetate propionate, cellulose acetate butyrate or cellulose propionate butyrate may also be used.

In coating articles of food, it is most preferable to use a composition comprising the cellulose ester, a non-toxic glycol and a non-toxic plasticizer for said ester. The cellulose organic acid ester preferably comprises from about 40 to 60% of the composition and most preferably from about 45 to 55%. The plasticizer preferably comprises from about 30 to 59% of the composition and most preferably from about 40 to 53%. The glycol preferably comprises from about 1 to 10% of the composition and most preferably from about 2 to 5%.

The hot melt coating composition of this invention may be applied by any of the conventional methods of the application of hot melt coatings such as spraying, enrobing, and dipping. When the coating is applied to food products, either the dipping or spraying method of coating is preferred. In the dipping method, the articles are dipped into the molten composition to effect the coating "pick-up," after which they are withdrawn and the coating is allowed to harden.

In preparing the hot melt coating compositions, the viscosities of the composition may be controlled in accordance with the method of coating used and the desired thickness of the coat produced by varying the proportions of ingredients. By varying the proportions of ingredients within the aforementioned ranges and the temperature within the preferred range of 257° to 400° F., preferable coating thicknesses of from 5 to 70 mils may be obtained. In the coating of food products, particularly meat cuts, it is most preferable that the coating thickness be from about 5 to 40 mils. If the coating is applied by spraying coatings having a thickness of from 5 to 15 mils may be achieved. Such thin coatings are considered to be very economical commercially. Preferred viscosities of the coating composition range from about 500 to about 1500 centipoises.

In coating food products such as meat, it is desirable that the coating composition have a viscosity of from 300 to 1000 cp. and most preferably from 400 to 700 cp. at a temperature of 350° F. Where meat is being coated, the temperature of the hot melt is preferably more than 257° F. When being coated by dipping, the meat is immersed for a period of from 0.25 to 0.1 second and the coating is allowed to cool at the ambient temperature for from 30 to 120 seconds in order to harden.

The composition of this invention may, for example, be used in a process for coating frozen cuts of meat similar to the process set forth in U.S. 2,957,772 to Berkowitz et al.

The composition of this invention is very desirable in the coating of processed foods particularly processed meats, e.g. sausage, salami and liverwurst. Processed meats may be broadly described as meats which are dehydrated or treated chemically. This composition is particularly desirable in coating processed meats in which the water content of the original fresh meats is reduced. Advantageously, the water content is reduced to the extent that there is a 20% to 40% shrinkage in the volume of the meat. Processed meats having reduced moisture contents include salami, dry sausage and dry ham.

The present invention is further illustrated by the following examples.

*Example I*

A hot melt coating composition was prepared by heating a mixture of 45 parts of cellulose propionate flake having about 2.35 propionyl groups, 0.41 acetyl groups and 0.24 free hydroxyl groups per glucose unit and a viscosity of 0.35 second (ASTM D871–56), 55 parts of acetyl tributyl citrate and 5 parts of 1,2-propylene glycol to 350° F. under slow agitation.

While the mixture was maintained at 350° F. a cut of meat in the frozen state was immersed into the molten mixture for about 1 to 2 seconds. The coating was permitted to harden by allowing the coated meat to remain at room temperature for 30 seconds. The meat was covered by a colorless, tightly adhering, strong, flexible, non-toxic highly transparent coating 40 mils in thickness.

*Example II*

The hot melt composition of Example I maintained at 350° F. was sprayed on to a cut of meat to completely coat the meat. The coating was permitted to harden by being exposed to room temperature for 30 seconds. The coating applied was 15 mils in thickness and had properties similar to the coating of Example I.

*Example III*

The hot melt composition prepared in Example I was compared to an identical composition except that the 1,2-propylene glycol was not included. In order to subject these compositions to conditions to which they would be subjected when used in hot melt coating, each composition was maintained at 350° F. under slow agitation for several hours. The composition containing the glycol showed substantially less discoloration after 5 hours than the composition without the glycol did after 2 hours. After 4 hours the viscosity of the composition with the glycol remained stable while the viscosity of the composition without the glycol did not stabilize but displayed abrupt drops in viscosity as the cellulose propionate degraded.

Further, the composition without the glycol displayed considerable fuming during the heating, giving off unpleasant and irritating fumes. There was substantially no fuming of the composition containing the glycol.

After 8½ hours, the compositions were cast on stainless steel in films having a thickness of about 40 mils and allowed to harden. The film formed from the composition without the glycol was tacky, had poor strength and could be scraped off with the fingernail while the film of the composition containing the glycol was not tacky, had very good strength and could not be scraped off with the fingernail.

It is to be understood that the foregoing detailed description is given merely by way of illustration and that many variations may be made therein without departing from the spirit of our invention.

Having described our invention what we desire to secure by Letters Patent is:

1. A coating composition for articles of food consisting essentially of from 40 to 50 parts of cellulose propionate, from 1 to 5 parts of propylene glycol and from 45 to 59 parts of a non-toxic plasticizer other than said glycol for said ester.

2. A readily strippable coated article of food comprising an article of food and a thin layer consisting essentially of a cellulose organic acid ester, said ester groups being derived from organic acids having 2 to 4 carbon atoms, about 1 to 10% of a non-toxic glycol selected from the group consisting of lower aliphatic diols, ethers of said lower aliphatic diols, polymers of said lower aliphatic diols, and polymers of said ethers, and a non-toxic plasticizer other than said glycol for said ester coated upon the surface of said article.

3. A readily strippable coated article of food comprising an article of food and a thin layer consisting essentially of cellulose propionate, about 1 to 10% of propylene glycol and a non-toxic plasticizer other than said glycol for said ester coated upon the surface of said article.

4. A coating composition in accordance with claim 14 adapted for coating articles of food wherein all of the constituents are non-toxic.

5. In a cellulose organic acid ester hot melt food-coating composition consisting essentially of a cellulose organic acid ester, said ester groups being derived from an organic acid having from 2 to 4 carbon atoms, the improvement comprising about 1 to 10% of a non-toxic aliphatic diol in melt degradation-stabilizing proportion and a non-toxic plasticizer other than said glycol in plasticizing proportions.

6. A food-coating composition in accordance with claim 5 wherein the ester is selected from the group consisting of cellulose propionate and cellulose butyrate.

7. In a cellulose organic acid ester hot melt food-coating composition wherein said ester is selected from the group consisting of cellulose propionate and cellulose butyrate, the improvement comprising about 1 up to about 10 weight percent of the total composition of a non-toxic glycol and from about 30 up to about 59 weight percent of the total composition of a non-toxic plasticizer other than said glycol.

8. An improved composition in accordance with claim 7 wherein the glycol is an aliphatic diol and wherein the plasticizer is selected from the group consisting of ester-type plasticizers and mineral oil-type plasticizers.

9. An improved composition in accordance with claim 7 wherein the glycol is propylene glycol and wherein the plasticizer is acetyl tributyl citrate.

10. A coating composition for articles of food consisting essentially of 45 to 55 weight percent of cellulose propionate, said cellulose propionate having from 0.2 to 0.3 free hydroxyl groups and at least 2 propionyl groups per glucose unit and a viscosity range according to ASTM D871–56 using a 20 percent solution in 90/10 acetone/ ethanol of from 0.2 to 10 sec., 40 to 53 weight percent of acetyl tributyl citrate, and from about 2 to 5 weight percent of 1,2 propylene glycol.

11. A coating composition for articles of food consisting essentially of 45 to 55 weight percent of cellulose butyrate, 40 to 53 weight percent of acetyl tributyl citrate, and from about 2 to 5 weight percent of 1,2 propylene glycol.

12. In the coating of an article of food wherein a hot melt of a cellulose organic acid ester coating composition consisting essentially of a cellulose organic acid ester, said ester groups being derived from an organic acid having from 2 to 4 carbon atoms, and a plasticizer for said ester in plasticizing proportion is applied to the surface of said article and the coated article cooled until the coating solidifies, the improvement comprising stabilizing said hot melt by including about 1 to 10% of a non-toxic glycol selected from the group consisting of lower aliphatic diols, ethers of said lower aliphatic diols, polymers of said lower aliphatic diols, and polymers of said ethers.

13. In a hot melt of a cellulose organic acid ester composition consisting essentially of a cellulose organic acid ester, said ester groups being derived from an organic acid having from 2 to 4 carbon atoms, and a plasticizer for said ester in plasticizing proportion, the improvement comprising about 1 to 10% of a non-toxic glycol selected from the group consisting of lower aliphatic diols, ethers of said lower aliphatic diols, polymers of said lower aliphatic diols, and polymers of said ethers.

14. A readily strippable hot melt coating composition, consisting essentially of (1) a cellulose organic acid ester, said ester groups being derived from organic acids having from 2 to 4 carbon atoms, and (2) from 1 to 10% of a glycol selected from the group consisting of lower aliphatic diols, ethers of said lower aliphatic diols, polymers of said lower aliphatic diols and polymers of said ethers, and a plasticizer for said ester.

15. The coating composition of claim 14, wherein said cellulose organic acid ester is selected from the group consisting of cellulose propionate, cellulose butyrate, cellulose acetate propionate, and cellulose acetate butyrate.

16. A hot melt coating composition consisting essentially of (1) from about 40 to 60% of a cellulose organic acid ester, said ester groups being derived from organic acids having from 2 to 4 carbon atoms, (2) from 1 to 10% of a glycol selected from the group consisting of lower aliphatic diols, ethers of said lower aliphatic diols, polymers of said lower aliphatic diols and polymers of said ethers, and (3) from 30 to 59% of a plasticizer for said cellulose organic acid ester.

17. The coating composition of claim 16, wherein said cellulose organic acid ester is selected from the group consisting of cellulose propionate, cellulose butyrate, cellulose acetate propionate and cellulose acetate butyrate.

References Cited in the file of this patent

UNITED STATES PATENTS

| | | |
|---|---|---|
| 1,999,182 | Dreyfus | Apr. 30, 1935 |
| 2,219,296 | Charch | Oct. 29, 1940 |
| 2,253,821 | Straughn | Aug. 26, 1941 |
| 2,840,476 | Wirt et al. | June 24, 1958 |
| 2,881,085 | Endicott et al. | Apr. 17, 1959 |
| 3,000,748 | Clark | Sept. 19, 1961 |

OTHER REFERENCES

Buttrey, "Plasticizers," Second Edition, 1957, pages 55–57.